(12) United States Patent
Park et al.

(10) Patent No.: US 11,099,431 B2
(45) Date of Patent: Aug. 24, 2021

(54) EDGE TYPE BACKLIGHT UNIT AND DISPLAY DEVICE INCLUDING THE SAME

(71) Applicant: LG Display Co., Ltd., Seoul (KR)

(72) Inventors: Hansol Park, Seoul (KR); Junsik Kim, Seoul (KR); Beodle Shin, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 29 days.

(21) Appl. No.: 15/598,745

(22) Filed: May 18, 2017

(65) Prior Publication Data

US 2017/0343858 A1    Nov. 30, 2017

(30) Foreign Application Priority Data

May 31, 2016 (KR) .................. 10-2016-0067388

(51) Int. Cl.
*G02F 1/13357* (2006.01)
(52) U.S. Cl.
CPC .............................. *G02F 1/133615* (2013.01)
(58) Field of Classification Search
CPC ................................................ G02F 1/133615
See application file for complete search history.

(56) References Cited

U.S. PATENT DOCUMENTS

| 4,059,916 | A | * | 11/1977 | Tachihara | ............ | G01D 11/28 40/448 |
| 5,944,405 | A | * | 8/1999 | Takeuchi | ............ | G02B 6/0051 362/617 |
| 6,266,476 | B1 | * | 7/2001 | Shie | ............ | F21S 48/2237 359/443 |
| 6,280,063 | B1 | * | 8/2001 | Fong | ............ | G02B 5/045 362/333 |
| 6,793,361 | B2 | * | 9/2004 | Matsui | ............ | G09F 13/14 362/241 |
| 6,913,365 | B2 | * | 7/2005 | Masaki | ............ | G02B 5/0215 359/566 |

(Continued)

FOREIGN PATENT DOCUMENTS

| CN | 1957276 A | 5/2007 |
| CN | 101661188 A | 3/2010 |

(Continued)

OTHER PUBLICATIONS

Office Action dated Jan. 10, 2020 issued in corresponding Chinese Patent Application No. 201710368094.1.

*Primary Examiner* — Rajarshi Chakraborty
*Assistant Examiner* — Fatima N Farokhrooz
(74) *Attorney, Agent, or Firm* — Morgan, Lewis & Bockius LLP

(57) ABSTRACT

The present disclosure relates to an edge type backlight unit and a display device including the same, and is capable of enabling other optical components including a reflecting plate, a diffusion plate, and a prism sheet to perform a light guiding function by eliminating a light guide plate from a backlight unit. Such an edge type backlight unit according to the present disclosure and the display device including the same are configured by eliminating the light guide plate so that there are effects in which the number of components and manufacturing costs may be reduced, and further an upper end of the display device may be slimmed down to improve an exterior quality.

11 Claims, 9 Drawing Sheets

(56) References Cited

U.S. PATENT DOCUMENTS

| | | | | |
|---|---|---|---|---|
| 2003/0002158 A1* | 1/2003 | Masaki | G02B 5/0221 | 359/599 |
| 2004/0114070 A1* | 6/2004 | Huang | G02B 6/0036 | 349/96 |
| 2005/0275764 A1* | 12/2005 | Ambrose | B29C 55/06 | 349/62 |
| 2006/0181901 A1* | 8/2006 | Sakai | G02B 6/0051 | 362/613 |
| 2007/0116916 A1* | 5/2007 | Ito | G02B 5/0221 | 428/46 |
| 2007/0189015 A1* | 8/2007 | Chang | G02F 1/133603 | 362/341 |
| 2010/0034987 A1* | 2/2010 | Fujii | B32B 27/36 | 428/1.1 |
| 2010/0053502 A1* | 3/2010 | Kim | G02B 6/0053 | 349/64 |
| 2010/0142188 A1* | 6/2010 | Ha | G02B 5/0221 | 362/97.2 |
| 2010/0142220 A1* | 6/2010 | Lee | G02B 6/0055 | 362/609 |
| 2011/0007506 A1* | 1/2011 | Kinoshita | G02F 1/133603 | 362/235 |
| 2013/0250616 A1* | 9/2013 | Ha | G02B 6/0091 | 362/613 |
| 2015/0212258 A1* | 7/2015 | Van Herpen | G02B 6/0085 | 362/609 |

FOREIGN PATENT DOCUMENTS

| | | |
|---|---|---|
| CN | 102257409 A | 11/2011 |
| CN | 103363398 A | 10/2013 |
| CN | 104583674 A | 4/2015 |
| JP | 2010157444 A | 7/2010 |
| KR | 10-2013-0104560 A | 9/2013 |
| KR | 10-1576397 B1 | 12/2015 |

* cited by examiner

FIG. 4

| LENGTH OF STRAIGHT SECTION (L2) | ABOUT 380mm | ABOUT 330mm | ABOUT 280mm |
|---|---|---|---|
| PICTURE | | | |
| BRIGHTNESS RATIO BETWEEN UPPER AND LOWER ENDS | ABOUT 106% | ABOUT 105% | ABOUT 101% |
| 9P UNIFORMITY | ABOUT 58% | ABOUT 61% | ABOUT 61% |
| CENTER BRIGHTNESS | 100% (REFERENCE VALUE) | ABOUT 105% | ABOUT 118% |

FIG. 6

| CURVATURE RADIUS (R) | NONE (STRAIGHT LINE) | ABOUT 2000mm | ABOUT 4000mm | ABOUT 6000mm |
|---|---|---|---|---|
| PICTURE | | | | |

FIG. 7

| GLOSS | ABOUT 27% | ABOUT 10% | ABOUT 45% |
| --- | --- | --- | --- |
| BRIGHTNESS RATIO BETWEEN UPPER AND LOWER ENDS | ABOUT 47% | ABOUT 39% | ABOUT 41% |
| PICTURE | | | |

FIG. 8

| SURFACE ROUGHNESS (Ra) UPPER SURFACE/ LOWER SURFACE | ABOUT 1um / ABOUT 10um | ABOUT 10um / ABOUT 1um | ABOUT 0.01um / ABOUT 1um |
|---|---|---|---|
| PICTURE | | | |
| BRIGHTNESS RATIO BETWEEN UPPER AND LOWER ENDS | ABOUT 55% | ABOUT 69% | ABOUT 93% |
| 9P UNIFORMITY | ABOUT 23% | --- | ABOUT 53% |

FIG. 9

| MOUNTAIN ANGLE | 90° | 95° | 100° | 105° | 110° | 112° | 113° | 114° | 115° | 120° | 135° |
|---|---|---|---|---|---|---|---|---|---|---|---|
| TOTAL AMOUNT OF EMITTED LIGHT(A) | | | | | | | | | | | |
| AMOUNT OF TRANSMITTED LIGHT(B) | | | | | | | | | | | |
| REFLECTION AMOUNT OF REAR SURFACE(C) | | | | | | | | | | | |
| LIGHT TRANSMISSION RATIO (B/A)% | ABOUT 19.3% | ABOUT 20.2% | ABOUT 22.2% | ABOUT 24.9% | ABOUT 27.9% | ABOUT 29.1% | ABOUT 29.6% | ABOUT 30.2% | ABOUT 30.8% | ABOUT 33.6% | ABOUT 44.4% |
| LIGHT REFLECTION RATIO (C/A)% | ABOUT 25.9% | ABOUT 27.4% | ABOUT 28.6% | ABOUT 29.4% | ABOUT 30.2% | ABOUT 30.3% | ABOUT 30.3% | ABOUT 30.3% | ABOUT 30.1% | ABOUT 29.0% | ABOUT 22.5% |

EDGE TYPE BACKLIGHT UNIT AND DISPLAY DEVICE INCLUDING THE SAME

CROSS-REFERENCE TO RELATED APPLICATIONS

This application claims the priority of Korean Patent Application No. 10-2016-0067388 filed on May 31, 2016, in the Korean Intellectual Property Office, the disclosure of which is hereby incorporated by reference in its entirety.

BACKGROUND

1. Technical Field

The present disclosure relates to an edge type backlight unit and a display device including the same, and more particularly, to an edge type backlight unit capable of enabling other optical components to perform a light guiding function by eliminating a light guide plate, and a display device including the same.

2. Description of the Related Art

A flat panel display (FPD) device is widely used in equipment such as a television, a mobile phone, a notebook, a tablet computer, and the like, and includes a plasma display panel (PDP) device, a liquid crystal display (LCD) device, an organic light-emitting display (OLED) device, an electrophoresis display device, and the like.

Such an FPD device is provided with a display panel which displays an image thereon, and, since an LCD panel itself does not generate light, it should be provided with a backlight unit which supplies light to the LCD panel.

The backlight unit may be classified into an edge light type backlight unit and a direct light type backlight unit according to a position of a light source, a cold cathode fluorescence lamp in the form of a bar has been mainly used as a light source, and in recent years, there is a trend that a light emitting diode (LED) is heavily used as the light source.

Since the edge light type backlight unit receives light supplied from a light source which is disposed at a lateral portion of the edge light type backlight unit, a light guide plate for directing the light from the lateral portion in a display panel direction has been used. In recent years, technology is being developed to transmit light toward a display panel using other optical components without a light guide plate.

FIG. 1 is a configuration diagram illustrating a display device provided with a typical edge type backlight unit, and FIG. 2 is a cross-sectional view illustrating the display device taken along A-A line of FIG. 1.

Referring to FIGS. 1 and 2, a typical display device includes a display panel 10, and a backlight unit 20 disposed at a rear surface of the display panel 10.

Here, the backlight unit 20 includes a light guide plate 23, a light source 21 disposed at one surface of the light guide plate 23, a reflecting plate 22 disposed at a rear surface of the light guide plate 23, and a diffusion sheet 24 and a prism sheet 25 which are disposed at an upper surface of the light guide plate 23.

The light guide plate 23 serves to guide light from a lateral surface of the backlight unit 20 in a direction of the display panel 10.

The diffusion sheet 24 or the prism sheet 25 is disposed at an upper portion of the light guide plate 23.

Also, the reflecting plate 22 is disposed at a lower portion of the light guide plate 23 to transmit light, which is emitted to a lower surface of the light guide plate 23, back to the upper portion of the light guide plate 23.

Light emitted from the light source 21 is reflected inside the light guide plate 23 after being incident on the light guide plate 23, and is guided to and emitted through the upper portion of the light guide plate 23.

The diffusion sheet 24 serves to diffuse the light emitted from the light guide plate 23, and the prism sheet 25 serves to collect the light emitted from the light guide plate 23 or light diffused at the diffusion sheet 24 in a direction perpendicular to a plane of the display panel 10.

A protection sheet (not shown) for protecting the prism sheet 25 from an external impact may be provided at an upper portion of the prism sheet 25.

The display panel 10 and the backlight unit 20 are modularized through an upper cover 40, a guide panel 30, and a cover bottom 26.

The present disclosure provides an edge type backlight unit capable of providing an equivalent level of surface light by enabling other components, which include a diffusing plate, a reflecting plate, a prism sheet, and the like, to perform a light guiding function even when the light guide plate 23 is eliminated from such an edge type backlight unit, and a display device including the same.

SUMMARY

Accordingly, embodiments of the present disclosure are directed to an edge type backlight unit and display device including that same that substantially obviate one or more of the problems due to limitations and disadvantages of the related art.

It is an object of the present disclosure to eliminate a light guide plate from an edge type backlight unit and a display device including the same, thereby reducing a weight of a product and manufacturing costs thereof.

Another object of the present disclosure to provide surface light at an equivalent level to which a light guide plate is provided even when the light guide plate is eliminated from a backlight unit by eliminating a light guide plate possessing a relatively high weight in the backlight unit, and by assigning a light guiding function to other optical components or enhancing the light guiding function.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

In accordance with one aspect of the present disclosure, an edge type backlight unit according to the present disclosure provides a structure capable of transmitting light through a reflecting plate instead of eliminating a light guide plate, and adjusting brightness uniformity using a diffusion plate and a prism sheet.

For this purpose, the reflecting plate is preferably provided with a straight section maintaining a uniform gap with respect to the diffusion plate, and an inclined section with which a gap with respect to the diffusion plate becomes narrower as being away from a light source.

A surface roughness Ra of an upper surface of the diffusion plate is preferable to be less than or equal to about 10 micrometers (μm), and a surface roughness Ra of a lower surface thereof is preferable to be less than and equal to about 1 μm.

Also, a mountain angle of the prism has an angle in the range of about 95 to 135 degrees so that surrounding dark portions may be reduced.

When the light source is disposed at a lower portion of the display device which is provided with the edge type backlight unit according to the present disclosure, there is an effect in which an upper end of the display device may be slimmed down to improve an exterior quality.

It is to be understood that both the foregoing general description and the following detailed description are exemplary and explanatory and are intended to provide further explanation of the inventive concepts as claimed.

BRIEF DESCRIPTION OF DRAWINGS

The accompanying drawings, which are included to provide a further understanding of the disclosure and are incorporated and constitute a part of this application, illustrate embodiments of the disclosure and together with the description serve to explain various principles. In the drawings:

FIG. 4 illustrates a measurement result of a brightness ratio between upper and lower ends of a panel of approximate 55 inches by disposing a light source at the lower end of the panel of approximate 55 inches and by varying a length of a straight section of the panel.

FIG. 6 illustrates a measurement result of variance of bright and dark portions at an inflection point part by varying a curvature radius of an inclined section of a reflecting plate of a backlight unit according to an embodiment of the present disclosure.

FIG. 7 illustrates a measurement result of a ratio in the total amount of light between the upper and lower ends by varying a gloss of a surface of a reflecting plate in which a length of a straight section is about 280 millimeters (mm).

FIG. 8 illustrates a brightness ratio between the upper and lower ends according to surface roughness of an upper surface and a lower surface of a diffusion plate.

FIG. 9 illustrates a measurement result of variance of brightness uniformity according to variance of a mountain angle of a prism sheet.

DETAILED DESCRIPTION

The terms and words used in the present specification and claims should not be construed as being limited to ordinary or dictionary meanings, and they should be interpreted as the meaning and concept in accordance with the technical spirit of the present disclosure based on the principle that the inventor can appropriately define the concept of the term in order to explain the invention in the best way. Also, embodiments described herein and configurations illustrated in the accompanying drawings are merely the most preferred embodiments of the present disclosure, and do not represent all the technical spirits of the present disclosure, and thus it should be understood that various equivalents and modifications may be substituted for the technical spirits at the time of filing the present application.

Figure 1:
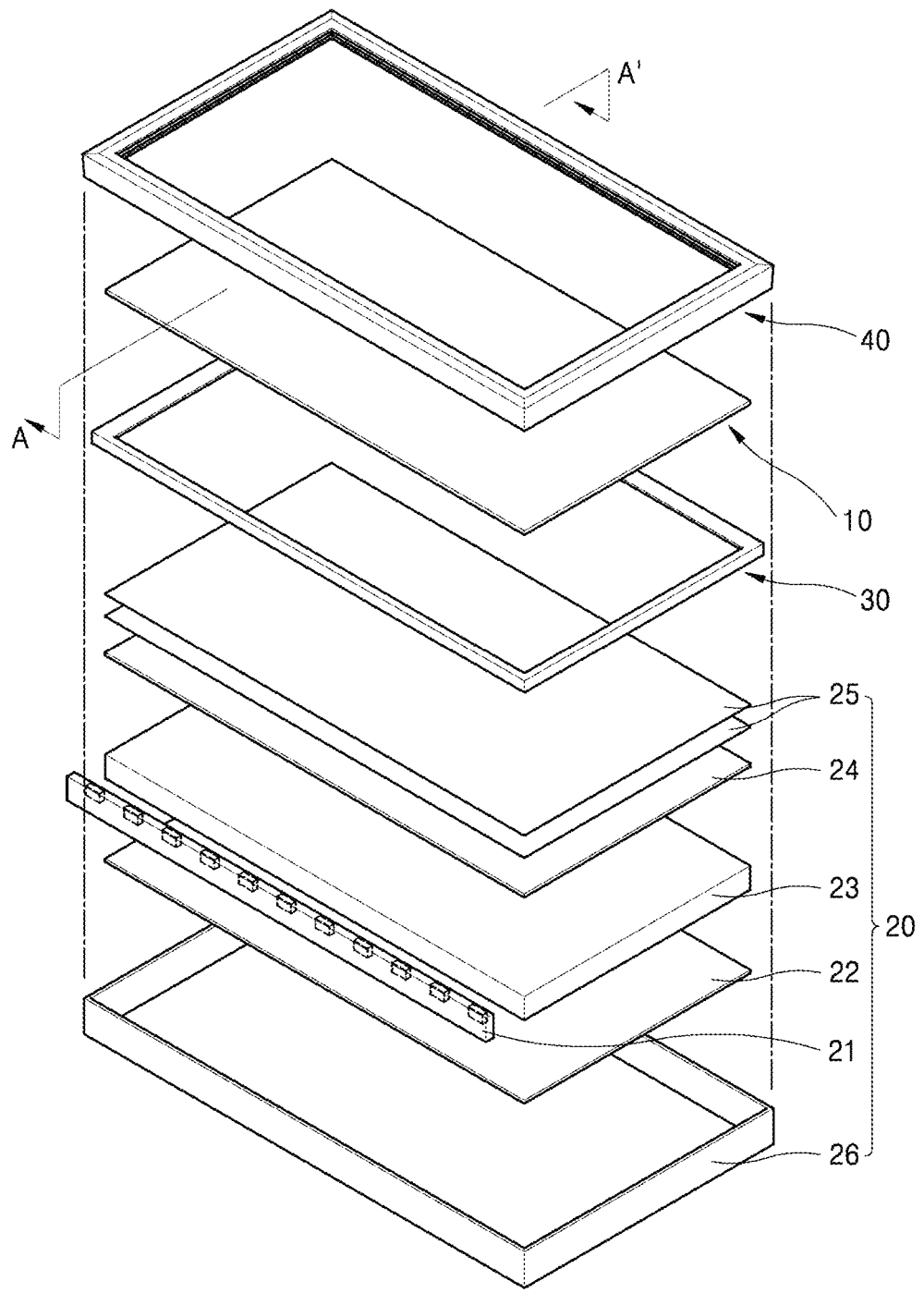
FIG. 1 is a configuration diagram of a display device provided with a typical edge type backlight unit.
Figure 2:
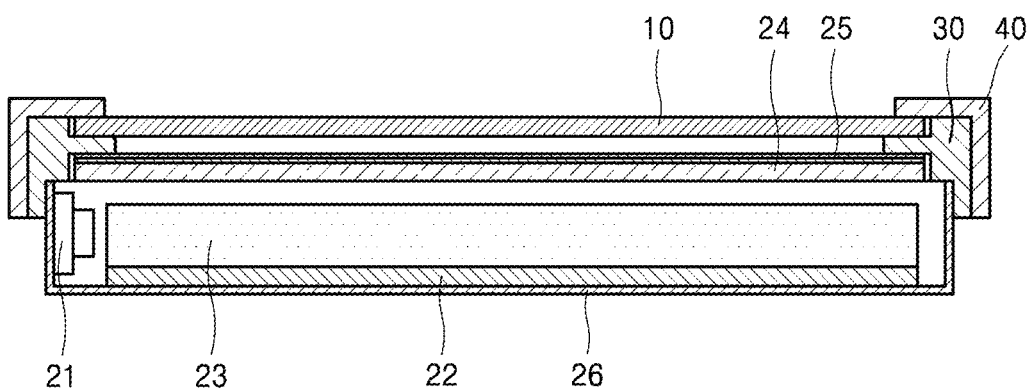
FIG. 2 is a cross-sectional view of the display device taken along A-A line of FIG. 1.
Figure 3:
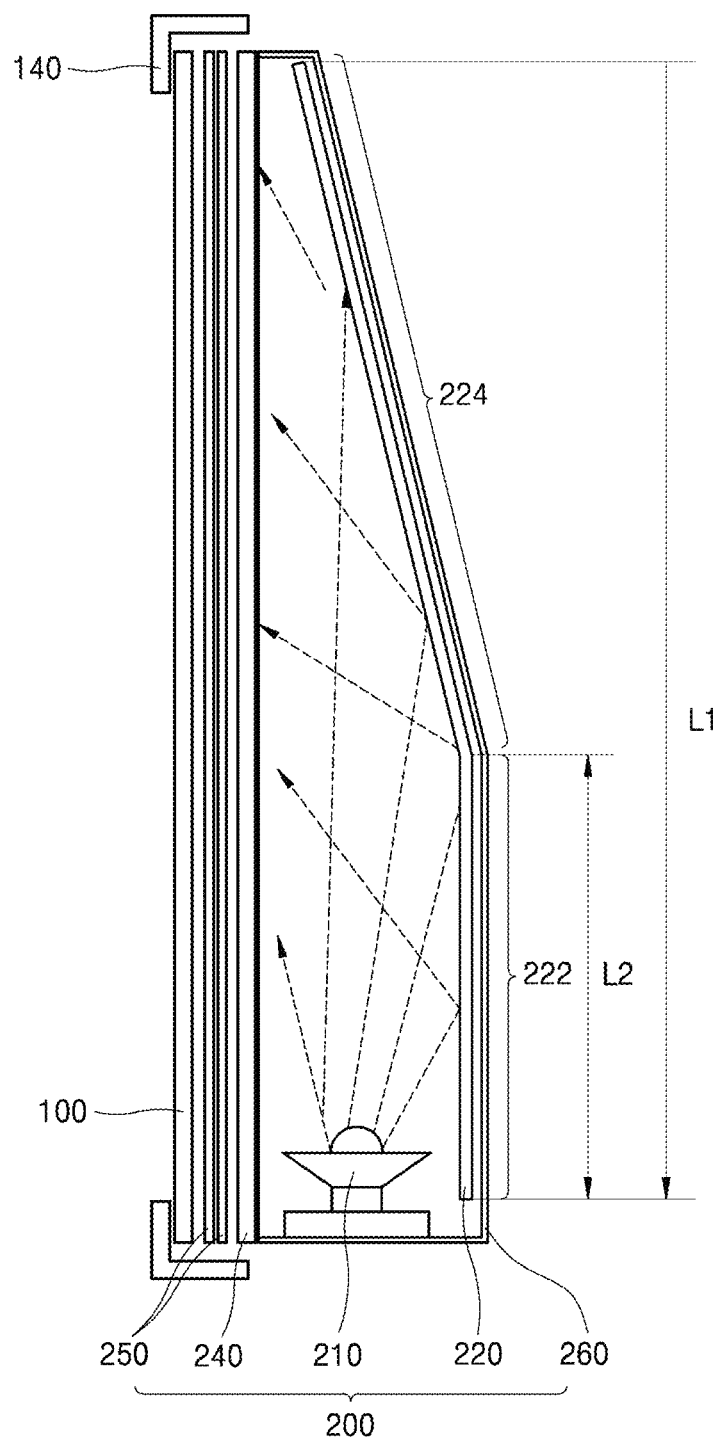
FIG. 3 is a cross-sectional view of a display device provided with an edge type backlight unit according to an embodiment of the present disclosure.

FIG. 3 is a cross-sectional view of a display device provided with an edge type backlight unit according to an embodiment of the present disclosure.

As shown in the drawing, the display device provided with the edge type backlight unit according to the present disclosure includes a display panel 100 configured to implement an image, and a backlight unit 200 provided at a rear surface of the display panel 100 and configured to provide surface light toward the display panel 100.

The backlight unit 200 includes a prism sheet 250 disposed at the rear surface of the display panel 100, a diffusion plate 240 disposed at a rear surface of the prism sheet 250, a reflecting plate 220 disposed at a rear surface of the diffusion plate 240, and a light source 210 disposed at one side of a space between the diffusion plate 240 and the reflecting plate 220.

In the display panel 100 according to the present disclosure, when the light source 210 is disposed at a lower end of the display device as shown in the drawing, a gap between an upper portion (that is, a side opposing the light source 210) of the reflecting plate 220 and the diffusion plate 240 becomes narrower such that a thickness of an upper portion of the display device may be slimmed down. A cover bottom 260 is coupled to an outer side of the reflecting plate 220, and a shape of the cover bottom 260 is configured to correspond to that of the reflecting plate 220. Of course, when a shape of the cover bottom 260 is configured in the form of a rectangular parallelepiped shape which accommodates the reflecting plate 220, the display device has an entirely uniform thickness.

Also, when a separate cover (not shown) is further included at an outer side of the cover bottom 260 and a shape of the separate cover is also configured to correspond to that of the reflecting plate 220, the thickness of the upper portion of the display device may be slimmed down.

The edge type backlight unit 200 according to the present disclosure is characterized by enabling other components, which include the reflecting plate 220, the diffusion plate 240, the prism sheet 250, and the like, to perform a light transmission function of a light guide plate even when the light guide plate is eliminated.

First, the reflecting plate 220 will be described below.

As shown in the drawing, the reflecting plate 220 of the backlight unit 200 according to the present disclosure is provided with a straight section 222 configured to uniformly maintain a gap with respect to the diffusion plate 240, and an inclined section 224 with which a gap with respect to the diffusion plate 240 becomes narrower as being away from the light source 210.

In other words, to increase an amount of light at a region that is far away from the light source 210 toward the display panel 100, the inclined section 224 is provided.

Here, the inclined section 224 may be formed with a straight surface or a curved surface.

When the reflecting plate 220 is provided with the straight section 222 and the inclined section 224, as shown in the drawing, the light source 210 is disposed to the straight section 222 and the inclined section 224 has a form in which the gap with respect to the diffusion plate 240 becomes narrower as being away from the light source 210.

In the case that the light source 210 is disposed at a lower portion of a screen, when a ratio of a length L2 of the straight section 222 with respect to a total length L1 of the reflecting plate 220 is increased, asymmetry occurs in a brightness ratio between a lower end of the screen (that is, a 50% region of the lower portion) and an upper end thereof (that is, a 50% region of an upper portion) such that a screen quality is degraded.

FIG. 4 illustrates a measurement result of a brightness ratio between upper and lower ends of a panel of approximate 55 inches by disposing a light source at the lower end of the panel of approximate 55 inches and by varying a length of a straight section of the panel.

In the 55-inch panel of which brightness is measured, a length L1 of each of the upper and lower ends is about 700 millimeters (mm).

Referring to FIG. 4, a brightness ratio between the upper end and the lower end is measured to be about 106% when a length of a straight section (that is, L2 of FIG. 3) is about 380 mm, the brightness ratio therebetween is measured to be about 105% when the length L2 of the straight section is about 330 mm, and the brightness ratio therebetween is measured to be about 101% when the length L2 of the straight section is about 280 mm.

The brightness ratio having 100% between the upper end and the lower end refers to that brightness of the upper end and the lower end are symmetrical to each other, the brightness ratio exceeding 100% therebetween refers to that the brightness of the upper end is greater than that of the lower end, and the brightness ratio not exceeding 100% therebetween refers to that the brightness of the upper end is less than that of the lower part.

Meanwhile, assuming that center brightness is 100% when the length L2 of the straight section is about 380 mm, the center brightness is measured to be about 105% when the length L2 of the straight section is about 330 mm, and is measured to be about 118% when the length L2 of the straight section is about 280 mm.

Even in the case of 9 P brightness uniformity which is measured by dividing a single picture into nine pictures, it can be seen that brightness uniformity may be controlled to be about 58%, 61%, and 61% by varying the length L2 of the straight section to have about 380 mm, 330 mm, and 280 mm, respectively.

Summarizing these results, it can be seen that the brightness ratio between the upper and lower ends is decreased and the center brightness is increases as the length L2 of the straight section is decreased.

Since each of the upper and lower lengths of the panel is 700 mm, in the case that the length L2 of the straight section corresponds to about 54% of the total length L1 when it is converted into a percentage, the brightness of each of the upper and lower ends of the picture appears to be uniform.

Therefore, the brightness of the upper and lower ends of the picture may be uniformly adjusted by eliminating the light guide plate and using the reflecting plate, and, for this purpose, the length L2 of the straight section of the reflecting plate is preferable to be in the range of 50 to 60% of the total length L1 of the reflecting plate.

However, when the length L2 of the straight section is appropriately set, the brightness of each of the upper and lower ends may be uniform as is described above, but there is a limitation that a dark portion partially occurs at a position (that is, an inflection point) at which the straight section 222 and the inclined section 224 meet with each other.

To address occurrence of a dark portion at a position at which the straight section 222 and the inclined section 224 are connected to each other, the present disclosure proposes to provide a curved section at the inclined section 224.

Figure 5:
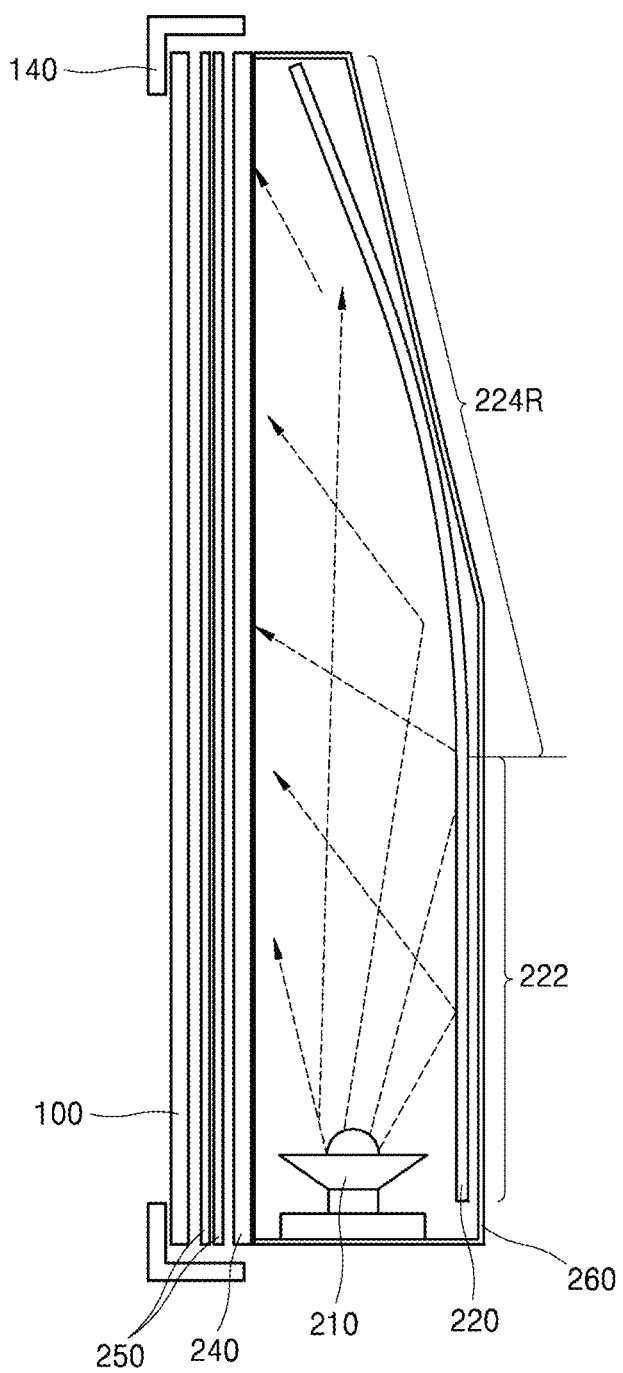
FIG. 5 is a cross-sectional view of a reflecting plate according to another embodiment of the present disclosure.

FIG. 5 is a cross-sectional view illustrating a reflecting plate according to another embodiment of the present disclosure.

As shown in the drawing, when a beginning portion of an inclined section 224R is configured with a curved surface, which has a curvature coming into contact with the straight section 222, instead of that the inclined section 224 is configured with only a flat surface, it can be seen that a dark portion, which occurs at a boundary between the straight section 222 and the inclined section 224R, may be alleviated.

FIG. 6 illustrates a measurement result of variance of bright and dark portions at an inflection point part by varying a curvature radius of an inclined section of a reflecting plate of a backlight unit according to an embodiment of the present disclosure.

Referring to FIG. 6, it can be seen that a boundary between bright and dark portions remarkably appears at an inflection point part when the inclined section 224R is configured with only a flat surface, but the boundary therebetween becomes blurred and disappears when a curvature is applied to the inclined section 224R coming into contact with the straight section 222.

It can be seen that a boundary between the bright and dark portions even when the inclined section 224R is provided with a curved surface portion having a curvature radius of 2000 mm, or with a curved surface portion having a curvature radius of 6000 mm is more blurred than when the inclined section 224R is provided with only the flat surface, and the boundary therebetween is most blurred when the inclined section 224R is provided with a curved surface portion having a curvature radius of 4000 mm.

Since the reflecting plate 220 having the total length L1 of about 700 mm is examined, the curvature radius of 4000 mm is a curvature radius corresponding to 5.7 times the length of the reflecting plate 220.

On the basis of such results, the present disclosure proposes that an inclined section is provided with a curved surface portion coming into contact with a straight section, and a curvature radius of the curved surface portion has a curvature radius in the range of 5.5 to 6.0 times a length of a reflecting plate.

Meanwhile, another property for improving a light guiding function of the reflecting plate 220 includes a gloss.

The gloss is a property of a material surface performing a regular reflection of light, and is represented as a percentage by comparing an amount of light of regular reflection with respect to an incident light at a specific angle and amount of light with respect to a reference surface.

Hereinafter, a gloss refers with respect to light incident at an angle of 60 degrees.

FIG. 7 illustrates a measurement result of a ratio of the total amount of light between the upper and lower ends by varying a gloss of a surface of a reflecting plate in which a length of a straight section is about 280 mm.

As shown in the drawing, a ratio of the total amount of light between the upper and lower ends is varied according to the gloss.

Looking at results, a brightness ratio between the upper and lower ends is measured at a level of about 39% when the gloss is 10%, the brightness therebetween is measured at a level of about 47% when the gloss is 27%, and the brightness therebetween is measured at a level of 41% when the gloss is 45%.

Summarizing the results, the gloss of the reflecting plate 220 is preferable to be equal to or greater than about 20% so as to reduce a difference in brightness between the upper and lower ends of the picture.

Meanwhile, a scattering rate of light, which is reflected from the reflecting plate 220, may be adjusted by providing beads at the reflecting plate 220.

As a diameter of each of the beads is smaller, a brightness distribution rate is increased.

To uniform a brightness distribution, the diameter of each of the beads is preferable to be less than or equal to 10 micrometers (μm).

When the diameter of each of the beads exceeds 10 μm, the scattering rate is small and thus a problem is caused such that a local difference in brightness is increased.

Next, a diffusion plate of the backlight unit according to an embodiment of the present disclosure will be described below.

FIG. 8 illustrates a brightness ratio between the upper and lower ends according to surface roughness of an upper surface and a lower surface of a diffusion plate.

As shown in the drawing, a brightness ratio is also varied according to surface roughness of the upper surface (that is, a surface to a display panel) and the lower surface (that is, a surface to a reflecting plate) of the diffusion plate.

In the case of a typical diffusion plate, a surface roughness Ra of the upper surface has a level of about 1 μm, and a surface roughness Ra of the lower surface has a level of 10 μm.

However, when such a typical diffusion plate is used, it can be seen that a brightness ratio between the upper and lower ends is about 55% and thus a light guiding function is hardly exerted.

When the surface roughness Ra of the upper surface is increased and the surface roughness Ra of the lower surface is decreased in comparison with the typical diffusion plate, it can be seen that a light guiding function of transmitting light of the lower end toward the upper end is improved.

As shown in the drawing, it can be seen that the brightness ratio between the upper and lower ends is improved to about 69% when the surface roughness Ra of the upper surface is set to about 10 μm and the surface roughness Ra of the lower surface is set to about 1 μm, and the brightness ratio therebetween is improved to 93% when the surface roughness Ra of the upper surface is set to about 0.01 μm and the surface roughness Ra of the lower surface is set to about 1 μm.

Also, in terms of brightness uniformity, the 9 P brightness uniformity is improved from a level of about 23% to a level of about 53%.

Next, a prism sheet will be described below.

To improve a light collecting effect, a mountain angle is set to 90 degrees and applied to a typical prism sheet.

FIG. 9 illustrates a measurement result of variance of brightness uniformity according to variance of a mountain angle of a prism sheet.

As shown in FIG. 9, a light transmission ratio and a light reflection ratio are measured by varying a mountain angle using a material having a refractive index of about 1.53.

When a prism has a mountain angle of 90 degrees, a light transmission ratio is measured to be about 19.3% and a light reflection ratio is measured to be about 25.9%, and it is verified that the light transmission ratio is increased as the mountain angle of the prism is increased.

The light reflection ratio represents a trend of increasing as the mountain angle of the prism is increased and then showing a maximum value of about 30.3% around in the range of about 112 to 114 degrees of the mountain angle, and then shows a trend of decreasing as the mountain angle is more increased over the range of about 112 to 114 degrees.

As the measurement results, when the mountain angle of the prism is about 114 degrees, optimal results show such that the light transmission ratio is about 30.2% and the light reflection ratio is about 30.3%.

Also, in terms of a screen quality, it is verified that occurrence of the dark portion at a lateral surface is reduced due to increases of the light transmission ratio and the light transmission ratio.

This is because a light guide effect is increased due to an increase of a total reflection ratio inside the prism.

In accordance with the present disclosure, it is verified that a brightness distribution may be improved by setting the mountain angle of the prism to an obtuse angle (preferably, an angle in the range of 95 to 135 degrees) in the case of the prism sheet having a refractive index of about 1.45 to 1.60.

The edge type backlight unit according to the present disclosure may be configured by eliminating the light guide plate so that there are effects that the number of components configuring the edge type backlight unit may be reduced, a total weight of the edge type backlight unit may be decreased, and manufacturing costs of the edge type backlight unit may be reduced.

Also, the edge type backlight unit according to the present disclosure may be configured by eliminating the light guide plate that is a relatively heavy thing so that there is an effect of addressing a grinding problem and the like due to a collision and friction between the light guide plate and other components, which occur when vibration or impact is applied to the edge type backlight unit.

Further, the edge type display device according to the present disclosure may be configured by slimming down a thickness of a side opposing the light source so that there is an effect in which an exterior quality may be improved.

It should be understood that the above described embodiments are illustrative in all aspects and not restrictive, and the scope of the present disclosure will be defined by the appended claims rather than by the foregoing description. Further, it should be construed that all changeable and modifiable forms derived from the meaning and scope of the appended claims as well as all equivalents thereto are included within the scope of the present disclosure.

It will be apparent to those skilled in the art that various modifications and variations can be made in the edge type backlight unit and display device including the same of the present disclosure without departing from the technical idea or scope of the disclosure. Thus, it is intended that the present disclosure cover the modifications and variations of this disclosure provided they come within the scope of the appended claims and their equivalents.

DESCRIPTION OF REFERENCE NUMERALS

100: display panel
200: backlight unit
210: light source
220: reflecting plate
222: straight section
224 and 224R: inclined sections
240: diffusion plate
250: prism sheet
260: cover bottom

What is claimed is:

1. A backlight unit, comprising: a diffusion plate having a flat plate shape and configured to diffuse light; a light source disposed adjacent to a lower portion of one side of the diffusion plate; and a reflecting plate disposed to face the diffusion plate by interposing the light source, wherein the diffusion plate includes an upper surface at which light is emitted and a lower surface, wherein a surface roughness Ra of the upper surface is greater than a surface roughness Ra of the lower surface, wherein the reflecting plate includes a straight section disposed adjacent to the light source and an inclined section connected to the straight section, wherein the straight section comprises a flat shape and maintains a uniform gap with respect to the diffusion plate, wherein a ratio of a span of the straight section with respect to a total span of the reflecting plate is in a range of 50 to 60%, wherein a gap between the inclined section and the diffusion plate becomes narrower as being away from the light source, wherein the inclined section comprises: a first portion connected to the straight section, the first portion comprising a curved shape, and a second portion connected to the first portion, the second portion comprising a straight shape, and wherein a curvature radius of the first portion is about 5.5 to 6.0 times the span of the reflecting plate.

2. The backlight unit of claim 1, wherein the upper surface of the diffusion plate has the surface roughness Ra that is equal to or greater than about 10 micrometers (μm).

3. The backlight unit of claim 1, wherein an average particle diameter of each of beads of the reflecting plate is less than or equal to about 20 μm.

4. The backlight unit of claim 1, further comprising:
a prism sheet stacked at an upper part of the diffusion plate,
wherein a mountain angle of the prism sheet is in a range of about 95 to 135 degrees.

5. The backlight unit of claim 2, wherein the lower surface of the diffusion plate has the surface roughness Ra that is equal to or greater than about 1 μm.

6. The backlight unit of claim 3, wherein a gloss of the reflecting plate is equal to or greater than about 20%.

7. The backlight unit of claim 3, wherein a tangent line of the first portion is connected to the straight section.

8. The backlight unit of claim 4, wherein a refractive index of the prism sheet is in a range of about 1.51 to 1.58.

9. A display device, comprising: a display panel; a prism sheet disposed at a lower part of the display panel; a diffusion plate disposed at the lower part of the display panel; a light source disposed adjacent to a lower portion of one side of the diffusion plate; and a reflecting plate disposed to face the diffusion plate by interposing a light source, wherein the diffusion plate includes an upper surface at which light is emitted and a lower surface, wherein a surface roughness Ra of the upper surface is greater than a surface roughness Ra of the lower surface, wherein the reflecting plate includes a straight section disposed adjacent to the light source and an inclined section connected to the straight section, wherein the straight section comprises a flat shape and maintains a uniform gap with respect to the diffusion plate, wherein a ratio of a span of the straight section with respect to a total span of the reflecting plate is in a range of 50 to 60%, wherein a gap between the inclined section and the diffusion plate becomes narrower as being away from the light source, wherein the inclined section comprises: a first portion connected to the straight section, the first portion comprising a curved shape, and a second portion which is connected to the first portion, the second portion comprising a straight shape, and wherein a curvature radius of the first portion is about 5.5 to 6.0 times the span of the reflecting plate.

10. The display device of claim 9, wherein the light source is disposed at a lower side of a picture of the display panel.

11. The display device of claim 10, further comprising:
a cover bottom configured to accommodate the reflecting plate; and a cover configured to form an exterior of a rear surface of the display device,
wherein each of the cover bottom and the cover has a shape conforming to the reflecting plate.

* * * * *